March 24, 1959  C. N. JOHNSON  2,878,729
MULTIPLE TAG STRINGING MACHINE
Filed Nov. 22, 1957  14 Sheets-Sheet 1

INVENTOR.
CARL N. JOHNSON
BY Darby + Darby
ATTORNEYS

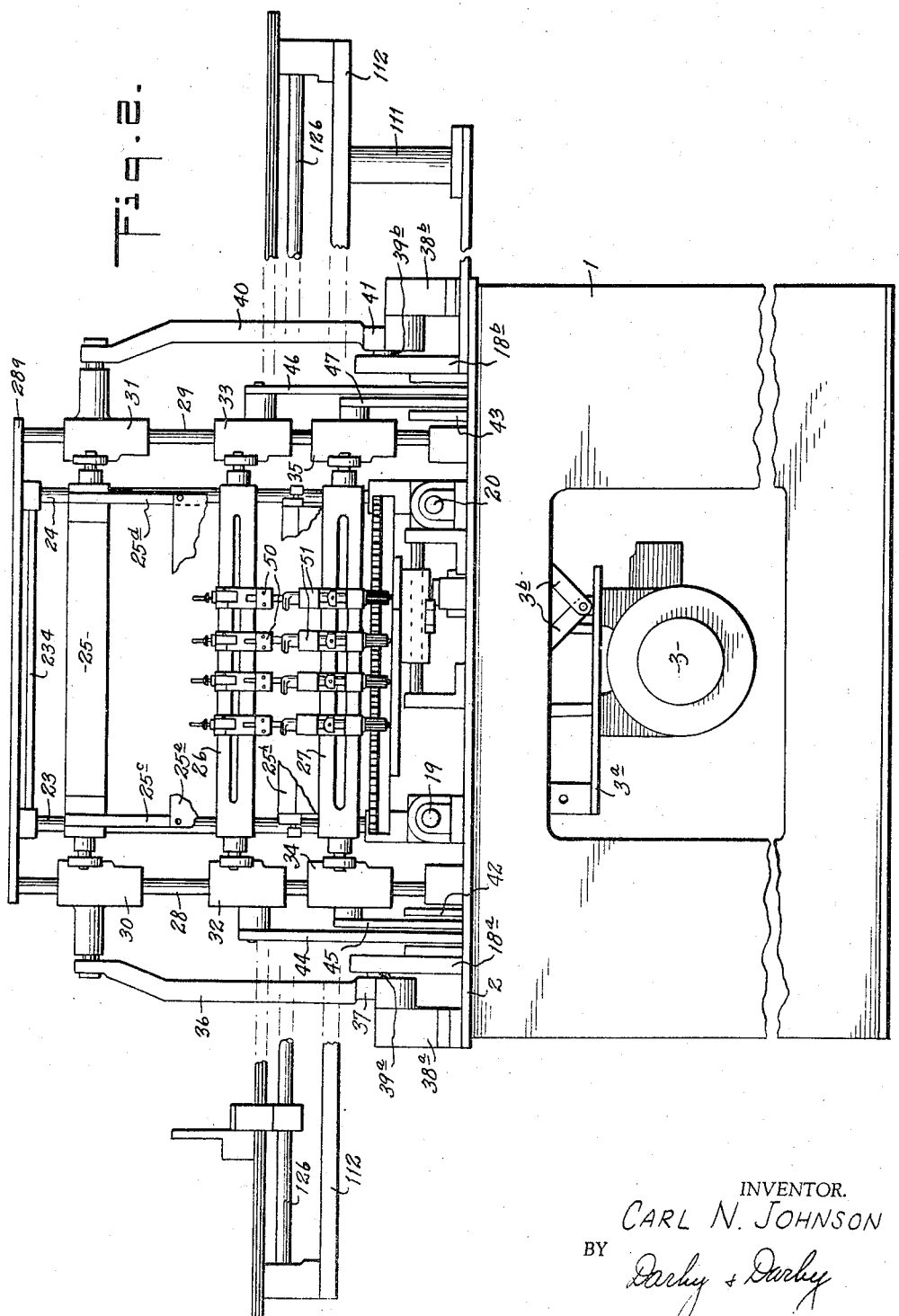

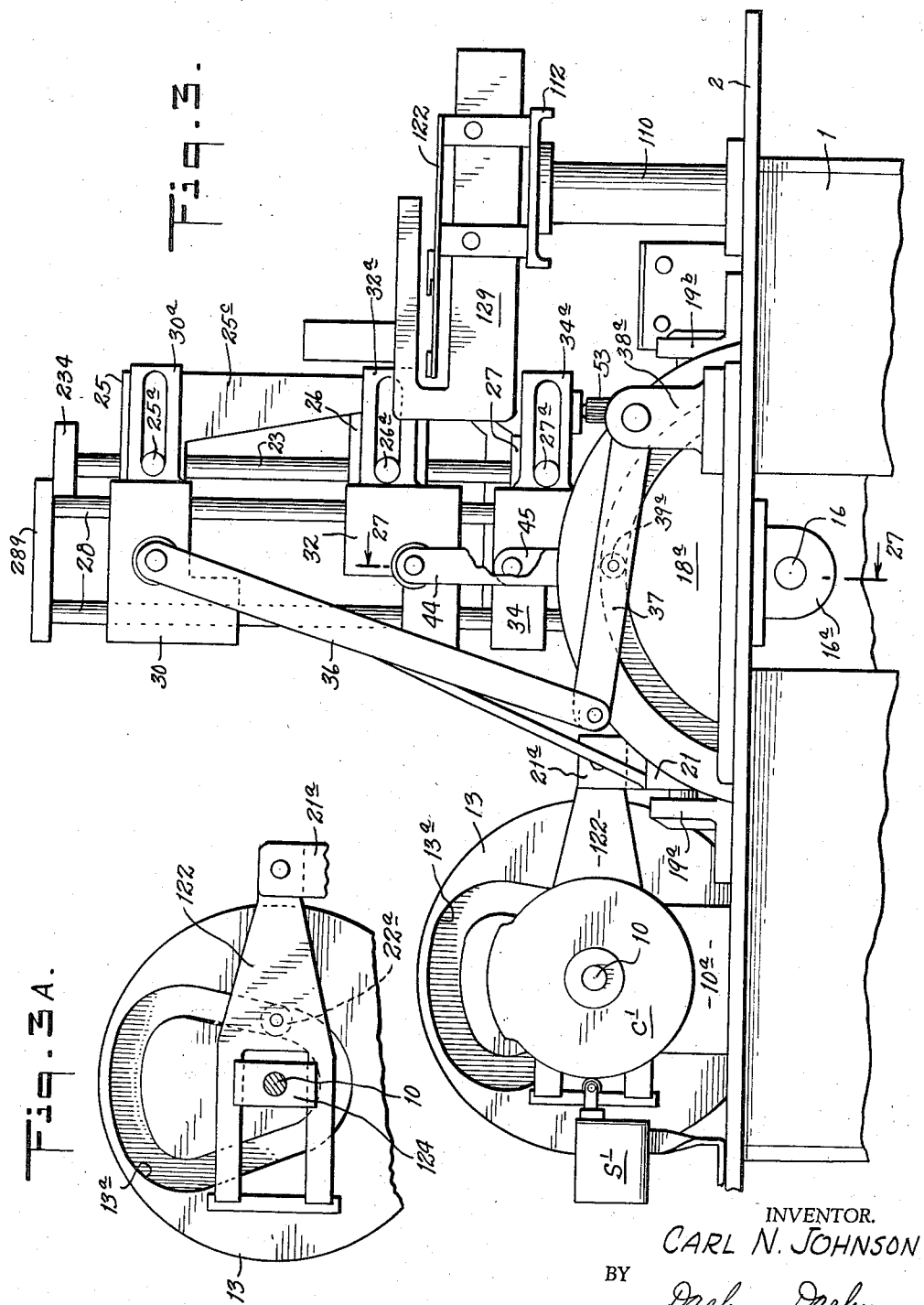

March 24, 1959
C. N. JOHNSON
2,878,729
MULTIPLE TAG STRINGING MACHINE
Filed Nov. 22, 1957
14 Sheets-Sheet 4
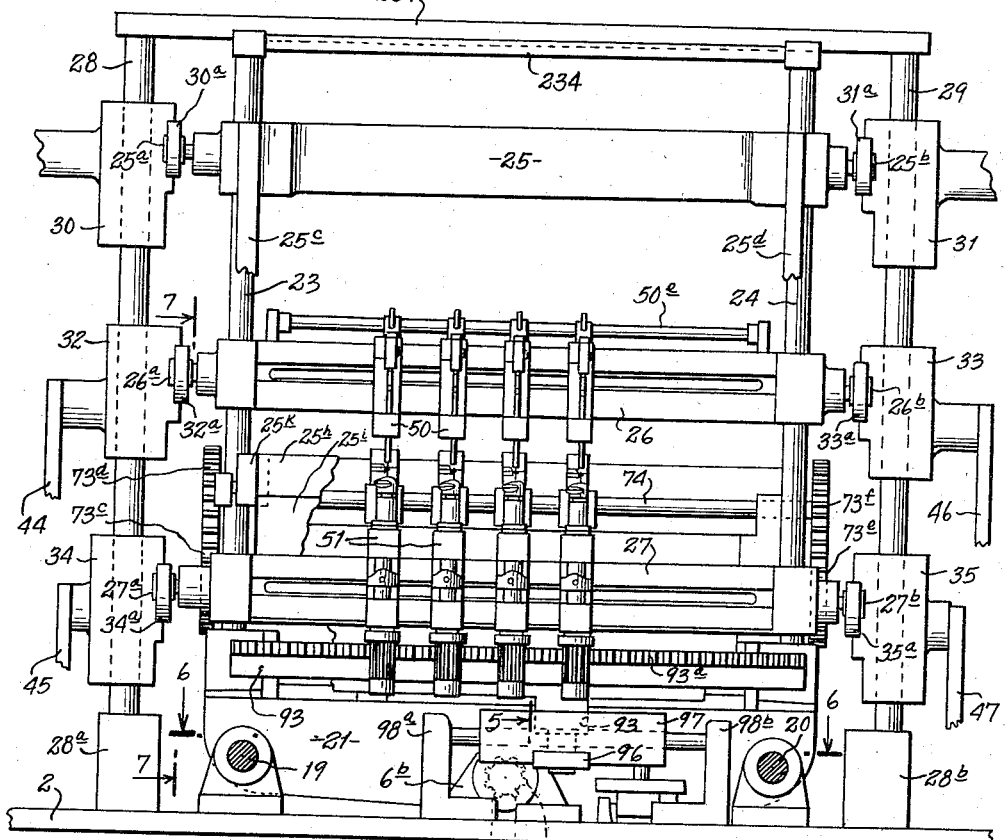
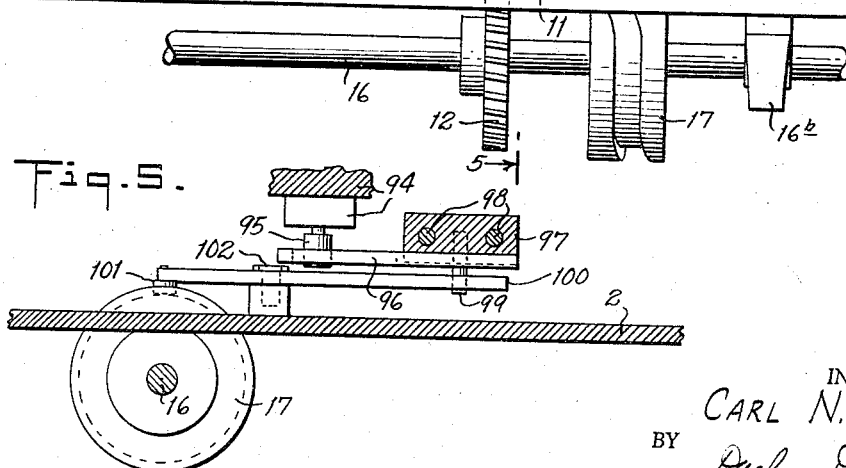
INVENTOR.
CARL N. JOHNSON
BY
Darby & Darby
ATTORNEYS March 24, 1959

C. N. JOHNSON 2,878,729

MULTIPLE TAG STRINGING MACHINE

Filed Nov. 22, 1957

INVENTOR.
CARL N. JOHNSON
BY
Darby & Darby
ATTORNEYS

March 24, 1959 C. N. JOHNSON 2,878,729
MULTIPLE TAG STRINGING MACHINE
Filed Nov. 22, 1957 14 Sheets-Sheet 7
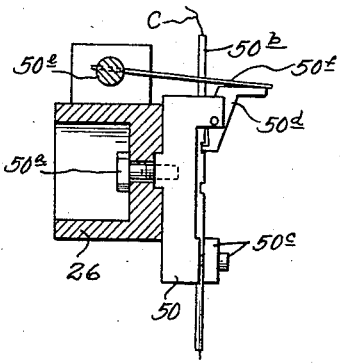
Fig. 8.
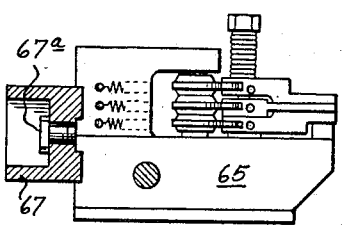
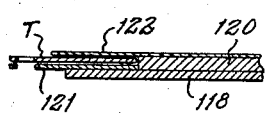
Fig. 9.
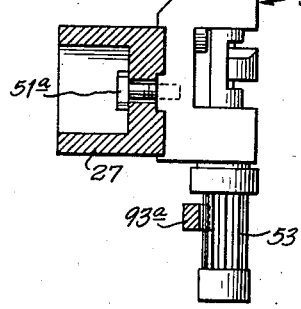
Fig. 10.
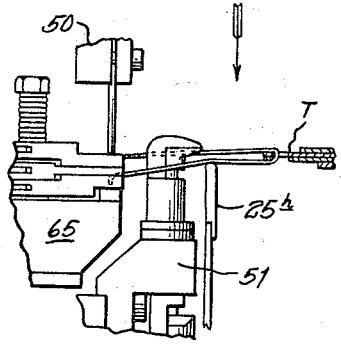
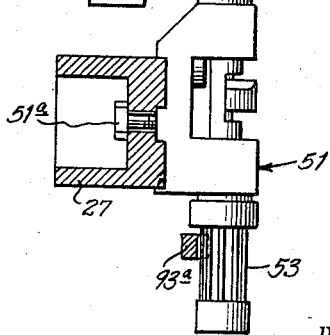
INVENTOR.
CARL N. JOHNSON
BY
Darby & Darby
ATTORNEYS March 24, 1959 C. N. JOHNSON 2,878,729
MULTIPLE TAG STRINGING MACHINE
Filed Nov. 22, 1957 14 Sheets-Sheet 9

INVENTOR.
CARL N. JOHNSON
BY
Darby + Darby
ATTORNEYS

March 24, 1959 C. N. JOHNSON 2,878,729
MULTIPLE TAG STRINGING MACHINE
Filed Nov. 22, 1957 14 Sheets-Sheet 10

INVENTOR.
CARL N. JOHNSON
BY
Darby & Darby
ATTORNEYS

March 24, 1959 — C. N. JOHNSON — 2,878,729
MULTIPLE TAG STRINGING MACHINE
Filed Nov. 22, 1957 — 14 Sheets-Sheet 11
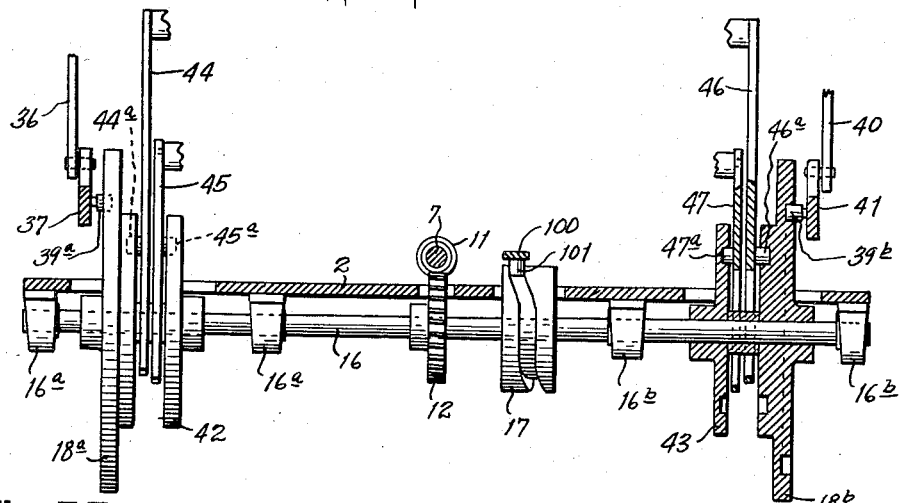
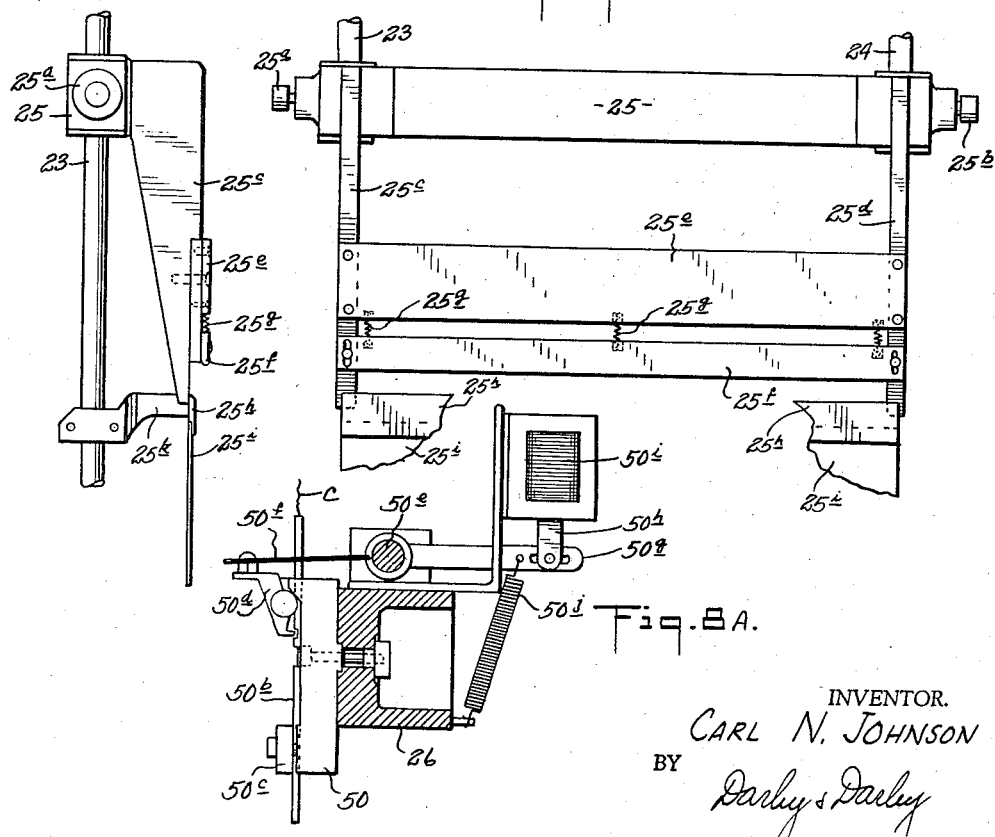
INVENTOR.
CARL N. JOHNSON
BY
Darby & Darby
ATTORNEYS

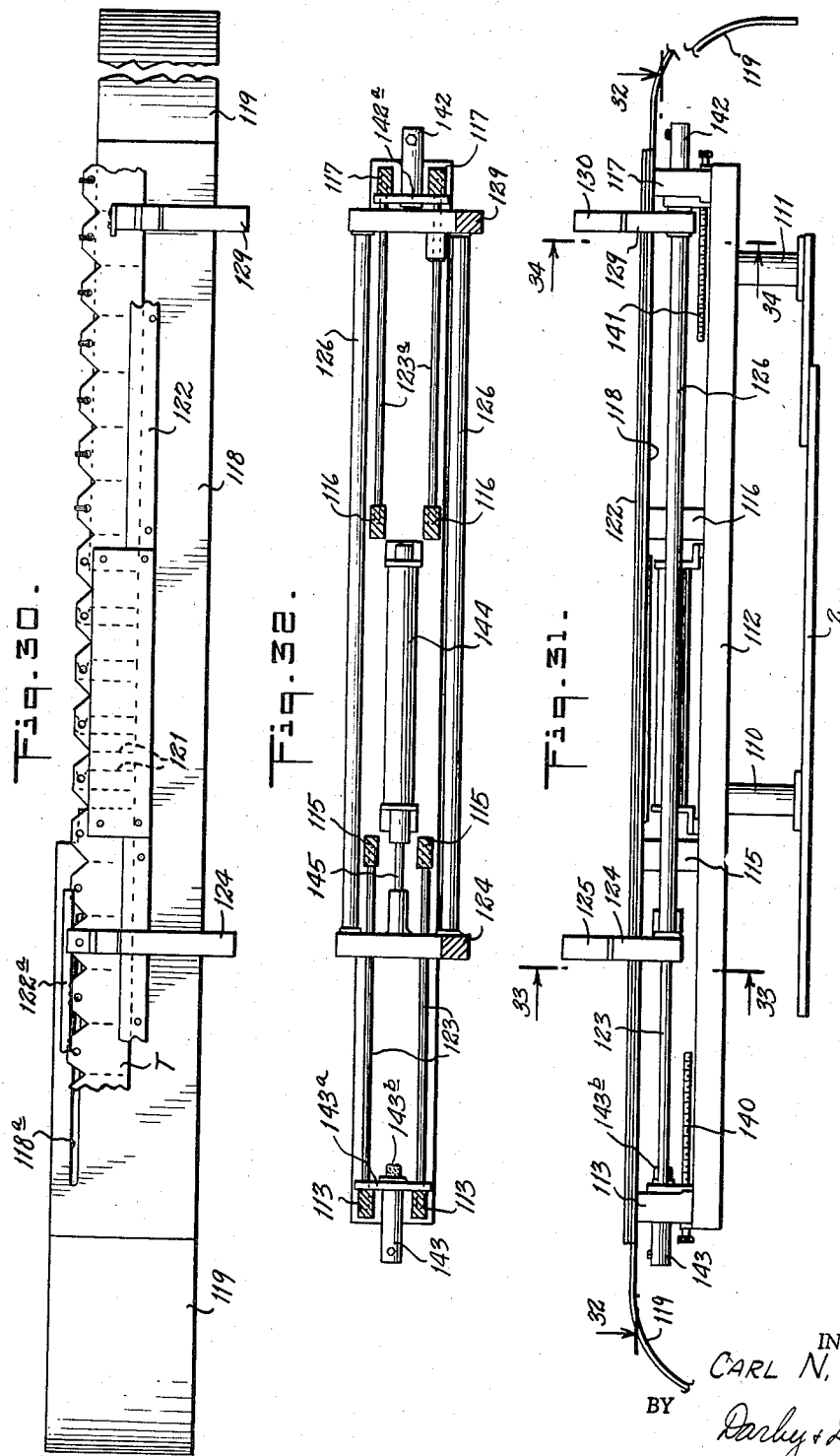

March 24, 1959 C. N. JOHNSON 2,878,729
MULTIPLE TAG STRINGING MACHINE
Filed Nov. 22, 1957 14 Sheets-Sheet 13
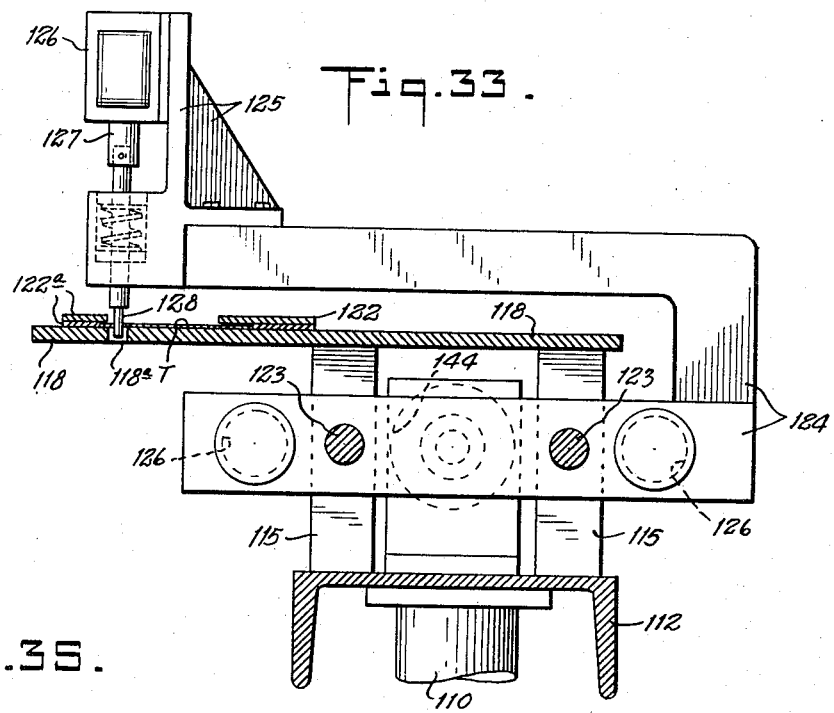
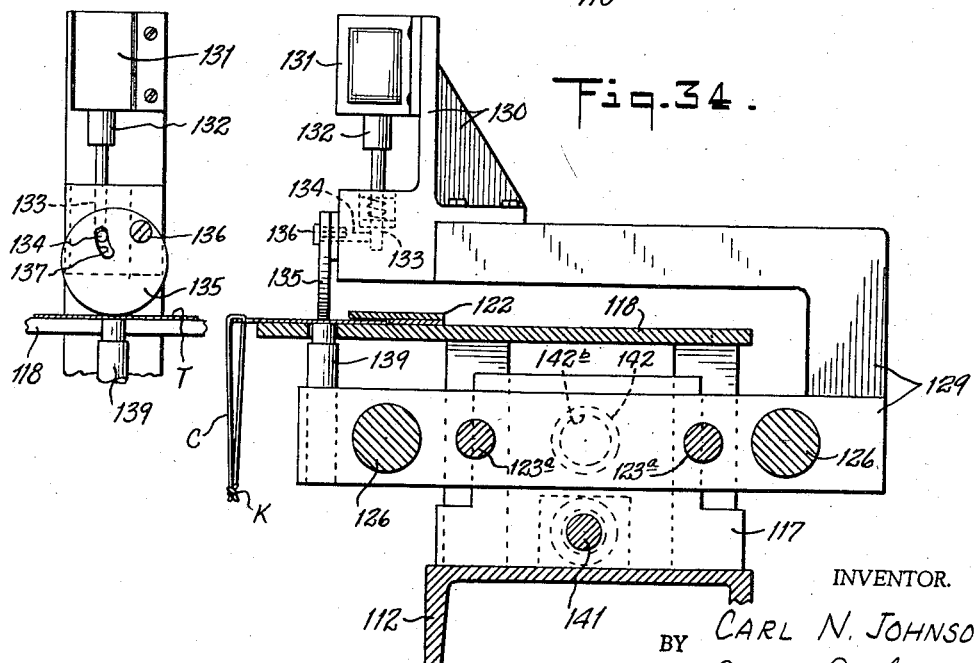
INVENTOR.
BY CARL N. JOHNSON
Darby & Darby
ATTORNEYS

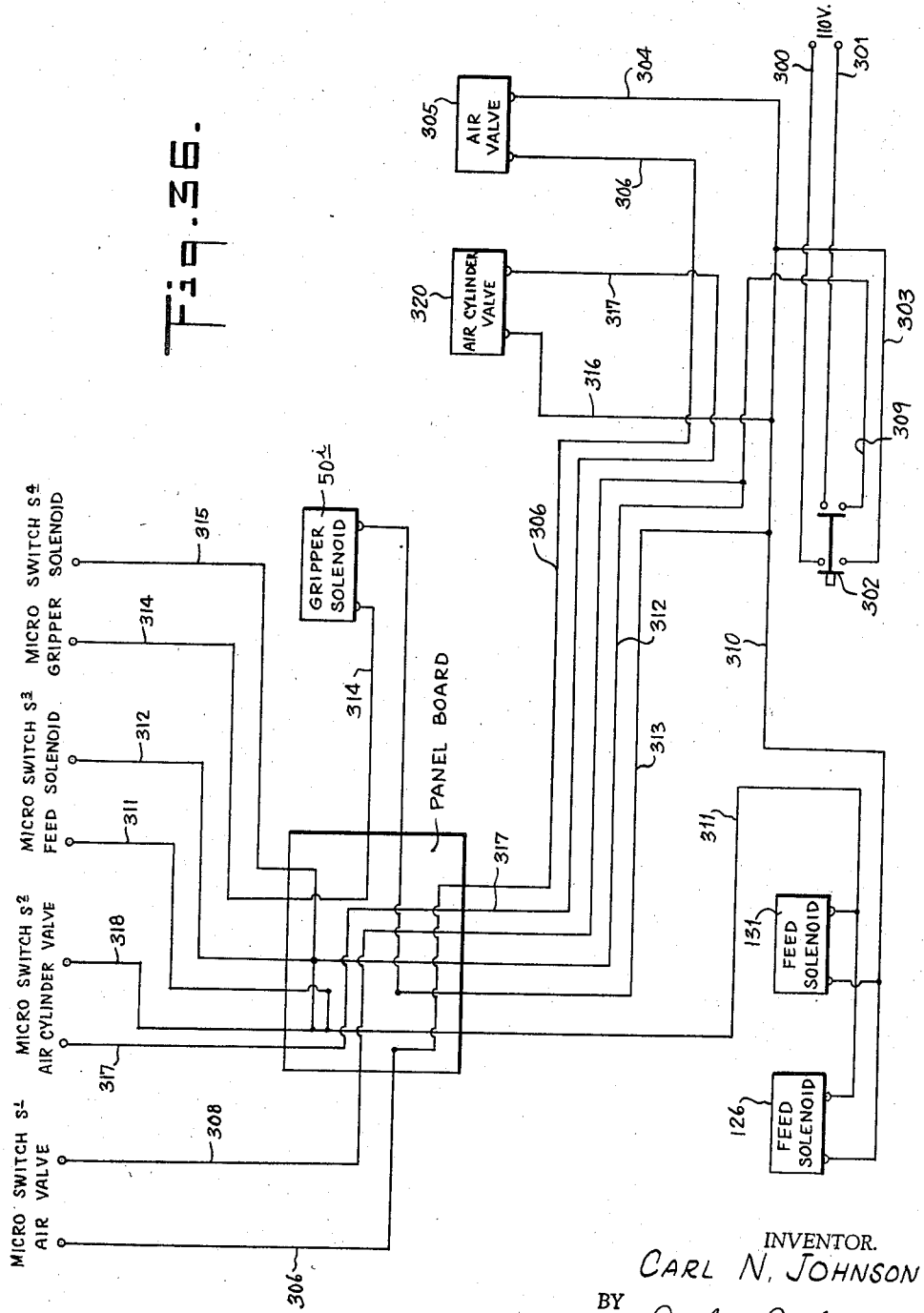

United States Patent Office 2,878,729
Patented Mar. 24, 1959

2,878,729

MULTIPLE TAG STRINGING MACHINE

Carl N. Johnson, Wayne, N.J., assignor to Johanson & Son Machine Corp., Clifton, N.J., a corporation of New Jersey Application November 22, 1957, Serial No. 698,176

15 Claims. (Cl. 93—91)

This invention is comprised of a mechanism for simultaneously inserting strings in a plurality of tags and tying the ends of the string in a simple knot.

An important object of the invention is to provide in a machine of this type a structure wherein by simple adjustments it may be adapted to simultaneously string tags in groups of different numbers of tags regardless of the width of the tags.

Still another object of the invention is to provide in the embodiment illustrated herein, means for feeding the tags in a continuous strip, step by step, to present predetermined numbers of tags to the stringing operation.

A further object of the invention is to provide in a mechanism of this type, means for preventing twisting of the strings during feeding, thereby minimizing stoppage of the machine due to this common source of operational difficulty with machines of this type.

A further object of the invention is to provide a mechanism for simultaneously feeding a plurality of strings individually to a plurality of tags, severing the strings into desired double lengths, and simultaneously tying the ends of the double lengths in a simple knot.

A further object of the invention is to provide a plurality of stringing and knot tying assemblies in pairs, which assemblies are adjustably mounted to adapt them to the application of strings to tags of an infinite number of centers within the range of the machine.

Still another object of the invention is to provide completely automatic machines of this type.

Other and more detailed objects of the invention will be apparent from the following description of the embodiment thereof illustrated in the attached drawings.

In the drawings,

Figure 2 is a front elevational view thereof with some parts broken away for better illustrative purposes;

Figure 3 is a lefthand side elevational view of the machine with a portion of the sub-base broken away;

Figure 3A is an elevational view from the plane 3A—3A of Figure 6;

Figure 4 is an enlarged front elevational view of the string feeding, thread and knot tying mechanism of the machine with many parts broken away and some in cross-section;

Figure 5 is a cross-sectional view taken on the line 5—5 of Figure 4;

Figure 8 is a typical cross-section through the gripper and cutter and knotter support bars showing a needle assembly in side elevation and the string clamp, a thread gripper and cutter in side elevation, and a knotter assembly in side elevation;

Figure 8A is a cross-sectional view showing the operator for the string holding fingers;

Figure 9 is a view similar to the view of Figure 7 showing the parts in the position where one of the thread needles has entered a tag hole;

Figures 10 to 15 inclusive are a similar view showing the relationship of the same parts at successively later times in the operation of the machine;

Figure 16 is a somewhat diagrammatic top plan view of the string grippers, the knotters and the tag web platform, showing the string looped through several tags just prior to the beginning of the operation of the knotters;

Figure 22:
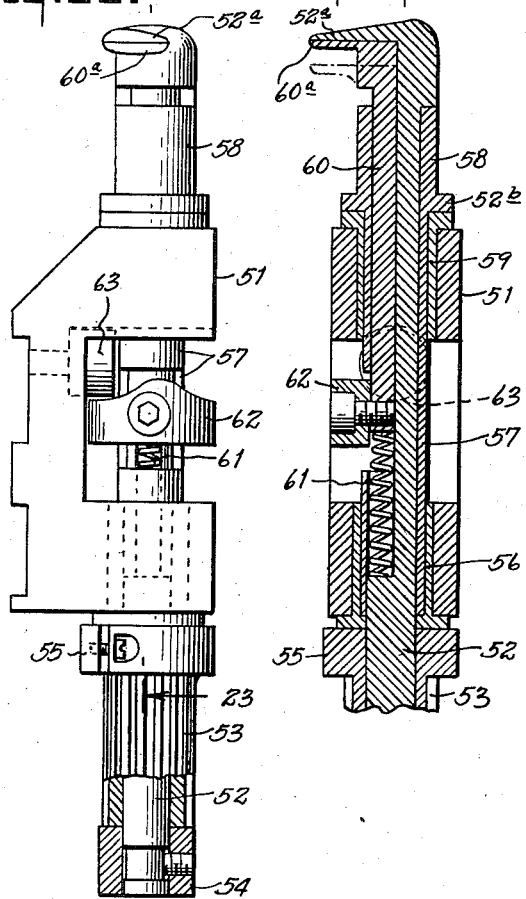
Figure 23:
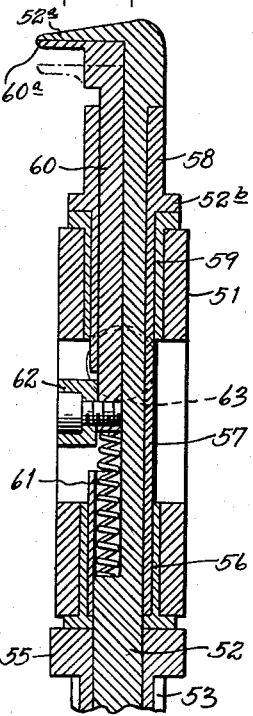
Figure 24:
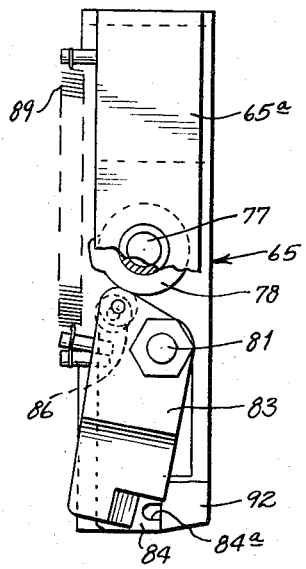
Figure 25:
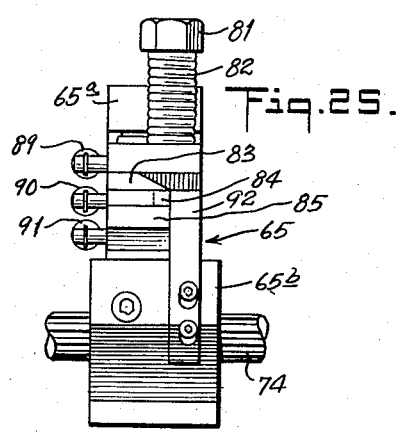
Figure 26:
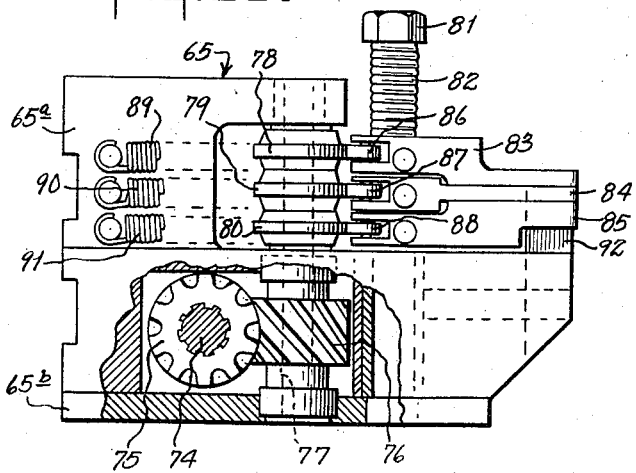

Figures 17 to 21 inclusive show successive stages in the action of the knotters;

Figure 22 is a side elevational view of a knotter assembly showing a detail in cross-section;

Figure 23 is a cross-sectional view taken on the line 23—23 of Figure 22;

Figure 24 is a top plan view of the string gripper and cutter assembly;

Figure 25 is a front elevational view thereof;

Figure 26 is a side elevational view thereof with some parts in cross-section;

Figure 27 is a vertical, cross-sectional view of the machine table in the plane of the main cam shaft showing the relative position of some of the parts, with many parts broken away;

Figure 28 is a front elevational view of the resilient abutment bar support;

Figure 29 is an end elevational view of the structure of Figure 28;

Figure 30 is a top plan view of the ticket feeding and guiding assembly;

Figure 31 is a front elevational view of the assembly of Figure 30;

Figure 32 is a cross-sectional view taken on the line 32—32 of Figure 31;

Figures 33 and 34 are cross-sectional views taken on the corresponding lines of Figure 31;

Figure 35 is a lefthand elevational view of the upper portion of the structure of Figure 34; and Figure 36 is a diagrammatic and schematic circuit illustration of the controls for the main components of the machine.

The purpose of this invention is to provide a machine for automatically inserting strings in perforations in tags, such as baggage, price and similar type tags. As illustrated, the machine is adapted to string tags which are fed thereto in the form of a strip or web, in which the tags are defined by tear lines by means of which they can be later separated for use. As will be apparent to those skilled in the art, the machine of this invention is not limited to applying strings to tags in strips or webs, since by modification of the tag feeding mechanism it will be possible to feed individual tags successively to the stringing position.

The machine illustrated in the attached drawings includes a base 1 in the form of a housing, which is closed at the top by means of a plate 2, forming a supporting table for most of the mechanism which is supported on and above the table. Mounted within the housing 1 is a main drive motor 3 for the entire mechanism. Although of no importance here, this motor is shown depending from a support plate 3, which is secured to the undersurface of the table 2 by means of an adjusting mechanism 3b, by means of which the center of the motor shaft can be vertically positioned by means of adjusting mechanism, not shown.

Figure 6:
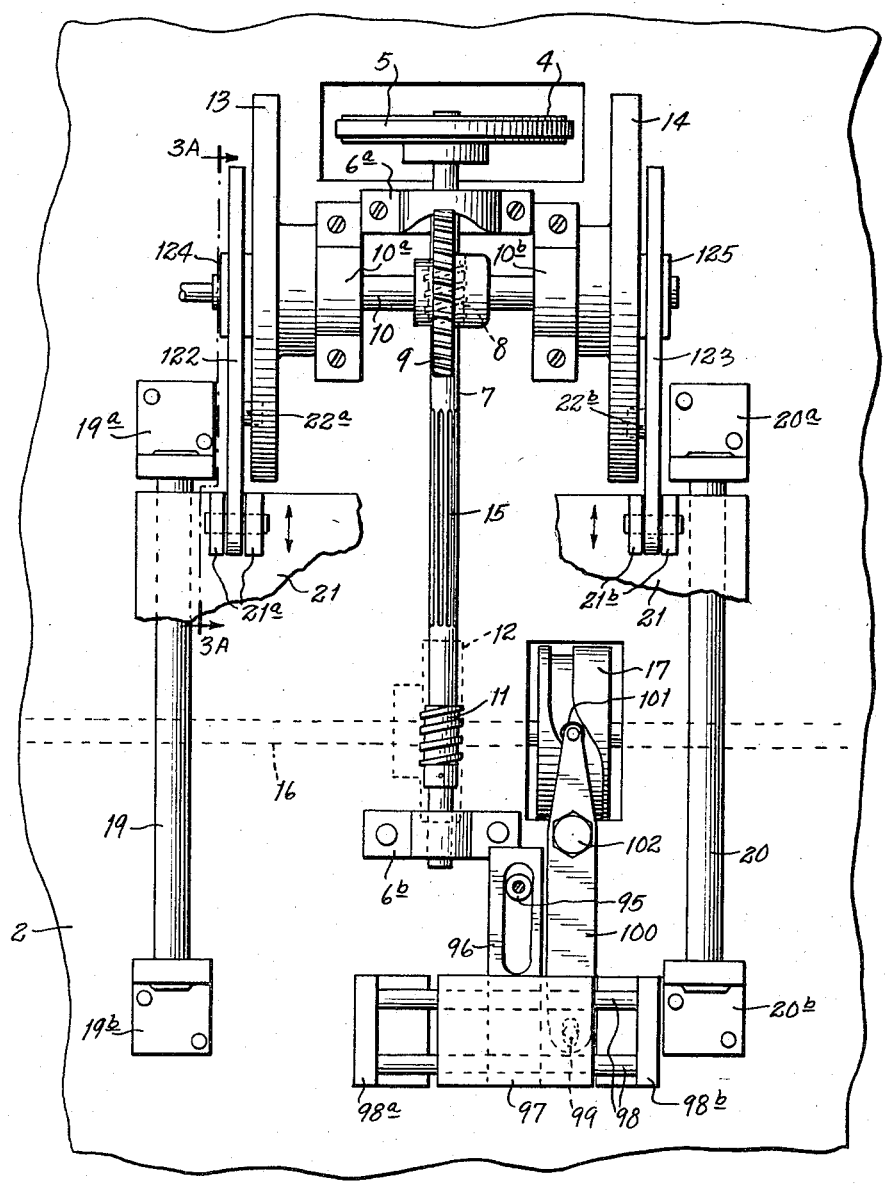
Figure 6 is a plan view with many parts broken away at the plane 6—6 of Figure 4.

Referring to Fig. 6, the drive pulley, not shown, of the motor, is connected by a belt 5 to a driven pulley 4 positioned above it, which pulley is mounted upon the end of a shaft 7 journaled in bearing supports 6ª and 6ᵇ. The end of the shaft 7 opposite the pulley 4, although broken off, extends to the front of the machine and is provided with a handwheel, not shown, by means of which the machine can be hand operated for adjusting and setup purposes. Mounted on shaft 7 is a worm 8, which meshes with the underside of a vertical wormwheel 9, mounted on a shaft 10. This shaft is journaled in a pair of bearing supports 10a and 10b attached to the top side of the table 2, as are the bearing supports 6a and 6b.

Also mounted on shaft 7 is a worm 11 which meshes with a wormwheel 12 mounted on the shaft 16 which extends under the table 2 and is journaled in bearing supports 16a and 16b, see Figs. 3 and 4 and 27. Also mounted on the shaft 16 is a cam 17 which is exposed on its top side through an opening in the plate 2. Later reference will be made to shaft 16 and the parts operated thereby. Intermediate the worms 8 and 11 is a gear tooth formation 15 on the shaft 7 of considerable length, for a purpose to be explained later.

Mounted on the ends of the shaft 10 are cam plates 13 and 14 having cam grooves on their outer faces, of which the cam groove 13a is shown in Figs. 3 and 3A.

Secured on top of the platform 2 are the pairs of aligned brackets 19a and 19b, and 20a and 20b, see Fig. 6, in which are mounted a pair of parallel guide rails 19 and 20. Slidably mounted on these rails is a generally rectangular carriage 21 which has two pairs of upstanding parallel lugs 21a and 21b at the rear edge thereof, see Fig. 6. Pivotally connected to these lugs are a pair of levers 122 and 123, which are bifurcated at their opposite ends and are slidably mounted in grooves on the opposite sides of the pair of guide blocks 124 and 125. These guide blocks are journaled on the ends of the shaft 10 and serve as a guide for the bifurcated ends of the levers 122, 123, see Figs. 3 and 3A, for example.

As illustrated in the case of the cam 13, the levers 122 and 123 are provided with cam followers 22a and 22b, which ride on the tracks on the faces of the cams 13 and 14, as for example track 13a of cam 13, see Fig. 3A.

Figure 7:
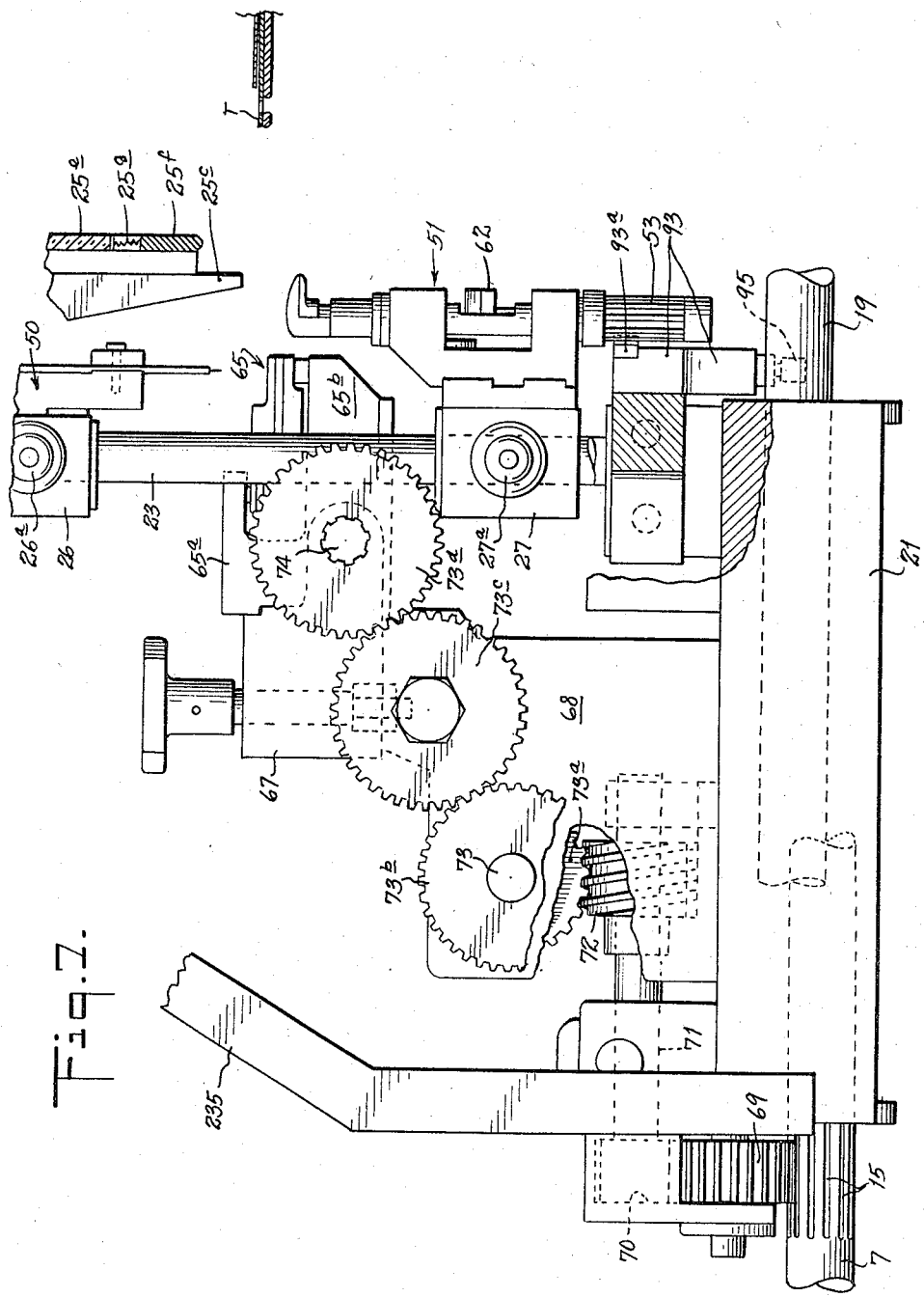
Figure 7 is a cross-sectional view taken on the line 7—7 with many parts broken away.

Mounted at their lower ends on the top face of the carriage 21, are a pair of vertical guide rods 23 and 24 which are connected at their upper ends by a cross-bracing bar 234, which are attached to the upper ends of a pair of braces 235, one of which appears in Fig. 7, which braces are secured at their lower ends to the carriage 21. Slidably mounted at its ends on the rods 23 and 24 is a resilient abutment bar assembly including the supporting bar 25, which has a pair of cam rollers 25a and 25b at its respective ends, see Fig. 4. These rollers lie in elongated slots in the extensions 30a and 31a respectively, of a pair of slides 30 and 31, see Fig. 3. These slides are vertically reciprocable upon the pairs of rails 28 and 29, see Fig. 3, which are supported in fixtures 28a and 28b secured to the table 2, Fig. 4. The upper ends of these rail pairs are braced by a cross-strut 289, see Figs. 1, 3 and 4. The slides 30 and 31 are given vertical movement on the rails by means of links 36 and 40, see Figs. 2 and 3, which are pivotally connected at their upper ends to the slides and pivotally connected at their lower ends to the levers 37 and 41. These levers are respectively pivoted on brackets 38a and 38b on the table 2, and are provided intermediate their ends with cam followers 39a and 39b which ride in cam tracks on the outer faces of the cams 18a and 18b. These cams are mounted on the shaft 16 and project upwardly through openings in the table 2, see Fig. 27.

Vertically reciprocable upon vertical rails 23 and 24 is the string needle bar 26, which like the bar 25 has cam follower rollers 26a and 26b on the ends thereof. These rollers engage in elongated slots in the extensions 32a and 33a on the slides 32, 33, which slides are also mounted on the rail pairs 28 and 29. These slides are given reciprocating movement on the rails by means of links 44 and 46 which extend downwardly on the inside faces of the cams 18a and 18b, see Fig. 27. The lower ends of the links 44 and 46 are bifurcated as in the case of the links 122 and 123. These bifurcated ends have sliding engagement with blocks journaled on the shaft 16, as in the case of the blocks 124 and 125, so as to insure back and forth movement of the links in fixed vertical planes. These links 44 and 46 are provided with cam follower roller 44a and 46a which engage in cam tracks on the inside faces of the cams 18a and 18b.

For recapitulation it is noted that the cams 18a and 18b each have cam tracks on both faces, as will be apparent from the previous description, and Fig. 27.

Also mounted for vertical reciprocating movement on the guide rails 23 and 24 is the knotter support bar 27, see Fig. 4, on the end of which cam follower rollers 27a and 27b are mounted. These rollers engage in elongated slots in the extensions 34a and 34b from another set of slides 34 and 35. These slides are mounted on the guide rail pairs 28 and 29 and are conjointly operated by a pair of links 45 and 47. These links are bifurcated at their ends, as in the case of the links 44 and 46 and are guided in slotted blocks also mounted on the shaft 16 adjacent the cams 42 and 43, see Fig. 27. These cams are face cams and have tracks on their outer faces in which cam follower rollers, 45a and 47a ride, which rollers are mounted on the links 45 and 47, respectively.

Mounted on the front face of the needle bar 26 are a plurality of string needle assemblies 50, which are vertically aligned with a series of knotter assemblies 51, see Fig. 4, which are mounted on the knotter bar 27.

One of the string needle assemblies, all of which are alike in construction, is clearly shown in Fig. 8. The base member 50 of the assembly is attached to the needle bar 26 by a cap screw 50a, as can be seen in Figs. 4 and 8. The needle bar 26 is provided with an elongated slot on its face wall so that the cap screws 50a can be entered therethrough at any point along the bar. Thus each needle assembly can be attached at any one of an infinite number of transverse points within the length of the slot. Clamped to the front face of the base 50 of the assembly, by means of a bolt and washer 50c, is a metal tube 50b through which the string C may pass longitudinally. Pivotally mounted on the front of the needle assembly base is a bell crank lever 50d, which has a reduced rearwardly extending finger at its lower end, which may engage the string C through a slot in the front face of the tube 50b, as clearly shown in Fig. 8.

Bearing upon the forwardly extending end of the bell crank lever 50d is a leaf spring 50f which is fixedly mounted in a shaft 50e, rotatably supported on the top of the needle bar, see also Fig. 8A. The shaft 50e has rearwardly extending arm 50g, actuated by the plunger 50h of the solenoid 50i, as is clear in Fig. 8A. The lever 50g is spring loaded so as to urge leaf spring 50f in a clockwise direction, Fig. 8A, thereby causing the lower end of the bell crank lever 50d to release string C from the back wall of the tube 50d when the solenoid is de-energized. When the solenoid is energized in a manner to be described later, shaft 50e is rotated in a counterclockwise direction, applying pressure on the bell crank lever by the spring 50f, so that it is clamped in the needle tube 50b when not being fed. As is clear from Fig. 8, the tube 50b has a lower notch, as shown, which is provided to aid in feeding the string C through the tube so that its end projects therebelow, when stringing-up the machine.

Figure 16:
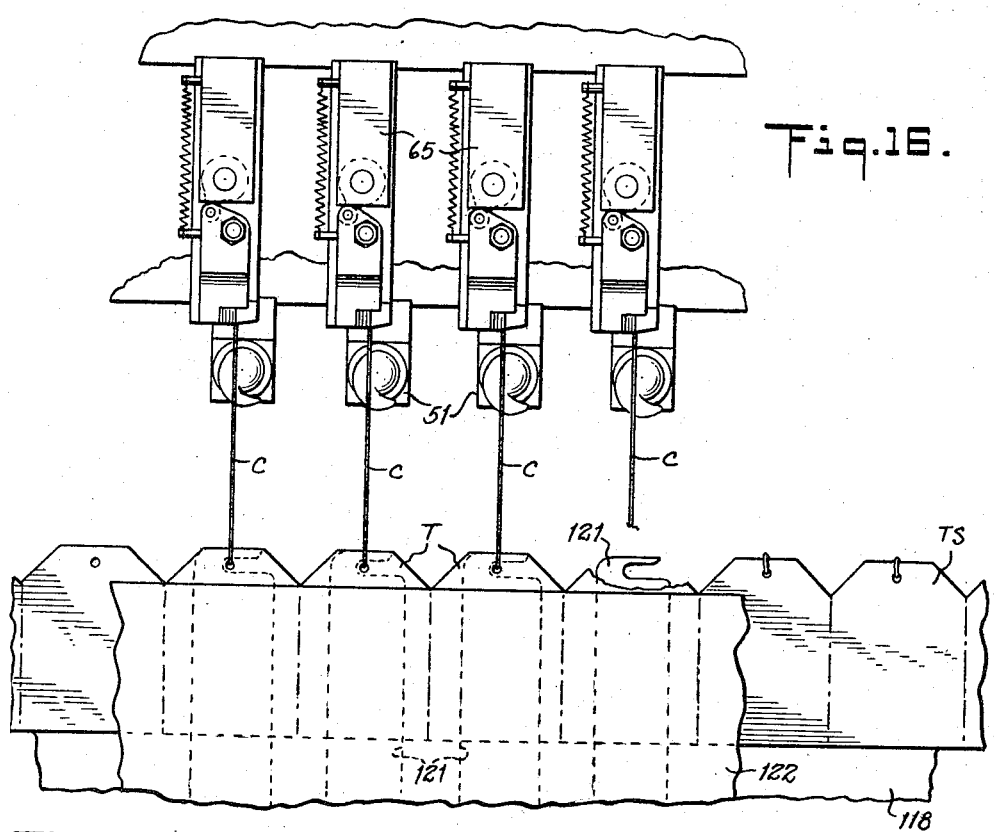

As illustrated in Fig. 9, the knotter assemblies 51 are also positionable at an infinite number of points transversely of the knotter bar 27, each assembly being secured thereto by an associated cap screw 51a. Thus the knotter assemblies can be positioned directly under the needle assemblies, respectively, each pair being transversely positionable along the related supporting bars so as to adapt the machine for stringing tags of different widths. In other words, the spacing between the centers of the perforations in the tags T, see Fig. 16 for example, will vary with different tag sizes, and one of the outstanding features of this machine is the provision of a construction which facilitates quick adjustment between the centers of the needle and knotter assemblies so as to condition the machine for stringing a wide range of tag sizes.

Referring again to Figs. 22 and 23, it will be seen that each knotter assembly has a base frame of bifurcated form having an aligned passage in which a shaft 52 lies. The upper end of this shaft is curved to form a bill 52$^a$. This shaft has a rotatable fit in a sleeve 57 which extends above the base of the fixture to provide a spacing extension 58 on which the shoulder formed in the shaft 52 at its upper end rests. The sleeve 57 is in turn journaled in a pair of bearing bushings 56 and 59. The shaft 52 has a flange 52$^b$ resting on the upper end of bushing 59. The lower projecting end of the shaft 52 has removably mounted thereon an elongated gear 53 which is held on the shaft by means of a sleeve and set screw 54. Integral with the gear 53 is a split collar 55 which through the agency of a screw can be clamped to the shaft 52. The reason for this construction will be explained later.

The shaft 52 is milled away for a substantial part of its length to provide a flat on which a complementary portion of the member 60 is slidably mounted. The upper end of this member is provided with a curved bill 60$^a$ of the same configuration as the bill 52$^a$ so that the two together form a cord clamp, as will be explained later. A compression spring 60 normally urges the lower bill member against the upper bill member, that is into the position where the bill is closed, as shown in Fig. 23. The sleeve 57 has an opening in the side wall through which a screw passes to attach a cam 62 to the member 60. The cam 62 is of about semicircular extent, see Fig. 7, and is provided with a cam configuration on its upper surface. This camming surface cooperates with a fixed cam roller 63, rotatably mounted on the base 51 of the assembly.

Associated with each unit comprising a knotter assembly and needle assembly is a gripper and string cutting assembly 65, the construction of which is illustrated in detail in Figs. 24, 25 and 26. There are as many gripper and cutter assemblies as there are needle and knotter assemblies, and the gripper and cutter assemblies 65 are mounted on a supporting bar 67 which extends transversely of the machine in back of the needle bar 26 and the knotter bar 27, as clearly shown in Fig. 7. Each of these assemblies is transversely adjustable on the bar 67 by means of associated cap screws 67$^a$, see Fig. 8. This bar is removably supported, see Fig. 7, on a framework 68, mounted on top of the carriage 21 and in back of the plane of the guide rods 23 and 24.

Each cutter and gripper assembly 65 includes a frame member 65$^a$ and cover plate 65$^b$ secured together. Journaled in this frame is a vertical shaft 77 on which is mounted a helical gear 76 and a group of vertically spaced cams 78, 79 and 80. The gear 76 meshes with a helical gear 75 which is slidably mounted on the splined shaft 74. This shaft can be seen also in Figs. 4 and 7. Pivotally mounted on a pivot bolt 81 under the loading of the compression spring 82, are three levers 83, 84 and 85. The lever 83, as is clear from Fig. 25, is provided with a cutting edge providing a string cutter by cooperative cutting action with the upper end of an anvil 92. The other levers 84 and 85 comprise respectively the upper and lower gripping members which, as will be explained later in cooperation with the anvil 92, provide the upper and lower grippers for the ends of the string when looped through the tag. Each of the levers 83, 84 and 85 is under the stress of the tension springs 89, 90 and 91 respectively, which tend to cause clockwise rotation of these levers, see Fig. 24. However, the rear ends of each of these levers are bifurcated and rotatably mounted in the bifurcations are the cam followers 86, 87 and 88 which cooperate respectively with the cams 78, 79 and 80 secured to the driven shaft 77. In the commercial form of the machine, the levers 84 and 85 are preferably constructed so that at least their outer active ends are resilient, minimizing the possibility of breaking if they engage a knot or lump on the string.

Figure 15:
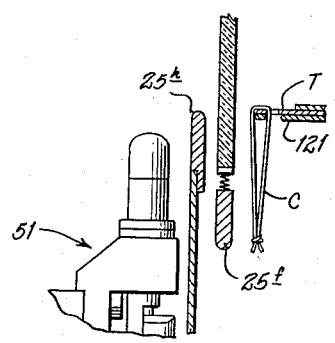

Referring now to Fig. 7, the manner of driving the splined shaft 74 will be explained. Mounted on the carriage 21 in suitable bearings is a pinion 69 which meshes with the elongated gear formation 15 on the shaft 7, see also Fig. 15. The pinion 69 meshes with another pinion 70 mounted on a shaft 71 journaled in bearings on the carriage 21. Secured on the shaft 71 is a worm 72 which meshes with a wormwheel 73$^a$ secured at the center of a shaft 73, see also Fig. 1. The shaft 73 is journaled in bearings formed in the plates 68 at the sides of the carriage so that it extends transversely thereof. On each outer end of the shaft 73 are gears, viz gears 73$^b$, Fig. 7, and a corresponding gear at the other side which does not show in the figures. These gears mesh with idler gears, viz the gears 73$^c$, Fig. 7, and 73$^e$, Fig. 4. Finally, the idler gears drive the gears 73$^d$, Fig. 7, and 73$^f$, Fig. 4, which are on the outer ends of the splined shaft 74. It is through this gear system that the splined shaft 74 is driven from the main shaft 7. The gears 75, there being one for each gripper-cutter assembly, have a sliding engagement with the splined shaft 74, as is clear from Fig. 26. These gears are confined within cavities in the base 65$^a$ of the gripper-cutter assemblies so that these assemblies can be shifted laterally back and forth on the support bar 67 to line up with the needle and knotter assemblies while maintaining driving connection with the splined shaft 74.

Referring now to Fig. 4, there is shown mounted on the front of the carriage 21, below the knotter assemblies, a bar 93 along the upper edge of which on its front face is a toothed rack 93a. The bar 93 is mounted on a support bar (not shown) slidably mounted for reciprocation transversely of the machine by the mechanism shown in Figs. 4, 5 and 6. The support plate 93 has a depending projection 94 on which is mounted a cam roller 95 pointing downwardly. This roller 95 engages in an elongated slot in an arm 96 secured to the end face of a block 97 which is slidably mounted for reciprocatory movement on a pair of rails 98, supported by fixtures 98$^a$ and 98$^b$ mounted on the top of the table 2 of the machine. Secured on the lower face of the block 97 and projecting downwardly is a cam follower 99 which engages in a slot in the end of a bell crank lever 100. This lever is pivoted intermediate its ends on a pivot pin 102 mounted in the platform 2. The other end of the lever is provided with a cam follower roller which engages in the cam track on the parallel cam 17 previously referred to as mounted on the shaft 16.

Figure 1:
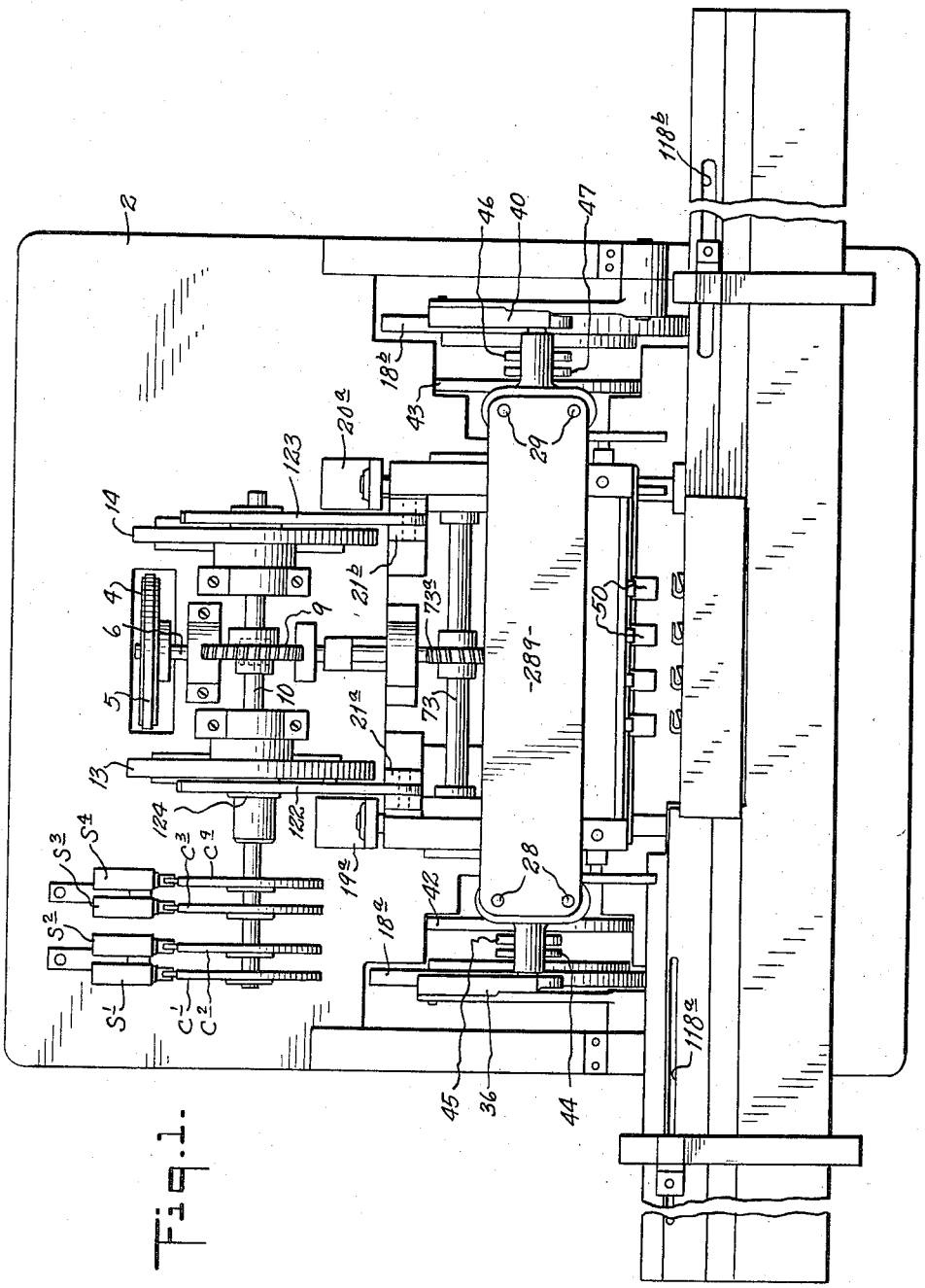
Figure 1 is a plan view of a preferred embodiment of the machine of this invention.

In passing for the moment, reference will be made to a series of cams, see Figs. 1 and 3, mounted on an integral extension of the shaft 10. There are four of these cams identified by the symbol $C^1$, $C^2$, $C^3$ and $C^4$. These cams actuate respectively control switches $S^1$, $S^2$, $S^3$ and $S^4$, for purposes to be later described in connection with the circuit shown in Fig. 36, and a description of the operation of the machine.

Returning to the resiliently supported abutment bar structure and referring particularly to Figs. 28 and 29, it will be seen that the vertically reciprocable supporting bar 25 has a pair of depending arms 25$^c$ and 25$^d$ on the front at the ends thereof. Secured to the front faces of these arms is a cross-bar 25$^e$ and extending parallel thereto and below it is the string engaging resiliently supported string drawing bar 25$^f$. The bar 25$^e$ can be secured to the arms 25$^c$ and 25$^d$ at different heights depending on the required lengths of the strings. As clearly shown in Fig. 28, this bar is slotted at the ends and held loosely on a pair of screws so as to have vertical sliding movement against the resistance of a series of compression springs 25$^g$ interposed between it and the bar 25$^f$. The purpose for which this structure is provided will be set forth in detail below.

A pair of arms 25$^k$, see Figs. 2, 3 and 7, are adjustably clamped on the rods 23 and mounted on their ends is an abutment bar 25$^h$ which extends in front of the knotter assemblies 51. The cooperative relation of bars 25$^f$, 25$^h$ and the knotters will be described later.

Referring now to Figs. 30 to 35 inclusive, the tag strip guiding and feeding mechanism will be described in detail. First it is noted, however, as clearly shown in Figs. 1 and 2, that this assembly is mounted on the top of the table 2 at the front of the machine. As more clearly shown in Fig. 31, it comprises a supporting bar 112 which is mounted at the righthand end of a standard 111 which is pivotally mounted on a lateral extension on the table 2. Secured to the bar 112 and spaced from the standard 111 is a standard 110 which is not attached to the platform 2 so that the entire assembly can be swung outwardly in a counterclockwise direction, Fig. 30, to permit the operator access to the mechanism at the front of the machine. When swung back into position, as shown in Fig. 1, this assembly extends across the top of the table 2 and parallel to the front of the machine.

Supported on top and at the ends of the bar 112 are pairs of uprights 113 and 117 and mounted therebetween in spaced relation are a similar pair of uprights 115 and 116. Secured on top of all of these uprights is a table 118 having downwardly curved extensions at the ends 119. Secured to the top of the table 118 and extending parallel to the edges thereof and spaced inwardly of the back edges, is a spacer strip 120. Secured on top of the spacer strip 120 and overhanging it is a guide strip 122. A cross-section of this structure in somewhat enlarged form is shown in Fig. 8.

At the lefthand end of the table 118, see Fig. 30, is a similar set of strips, shown at 122$^a$ lying parallel to the strips 120 and 122, all of which together form a guide track through which the tag strip T is guided in endwise movement. The strips 122$^a$ are interrupted at a point opposite the knotter and related assemblies to form a working gap, which fact is also indicated in Fig. 1. Secured on top of the table 118, at the working gap in this assembly, are a series of uniformly spaced plates 121 having open sided hook shaped ends, the function of which will be described later. An enlarged view of the shape of the plates 121 can be seen in Fig. 16. As shown in Fig. 8, these plates are positioned on top of the table 118 in the path of the tag strip T so that that strip moves across the top of them.

Extending from the standards 113, see Fig. 32, to a pair of similar standards 115, are a pair of parallel rails 123 at the lefthand end of this assembly, and at the righthand end similarly supported are the rails 123$^a$. Reciprocably mounted on these pairs of rails is a carriage composed of the end frames 124 and 129 which are rigidly connected together by a pair of parallel rods 126 to complete the carriage. The end frames 124 and 129 are generally U-shaped so as to extend transversely under the table 118 and transversely over it, as is clear from Figs. 33 and 34.

On the machine side of the frame 124 is a bracket 125 on which is mounted a solenoid 126 having its plunger 127 positioned for reciprocation on a vertical axis. Depending from the plunger is a feeding pin 128 which is normally held raised when the solenoid 126 is energized. Similarly on the inner end of the end frame 129 is a bracket 130 on which is mounted a solenoid 131 having a vertical plunger 132. This plunger has an extension 133 provided with a laterally positioned pin 134 which operates in an arcuate slot 137, in a clamping disc 135. The disc 135 is pivotally mounted off center on a pivot screw 136 on the bracket 130. As in the case of the structure of Fig. 33, the plunger 132 of the solenoid 131 is normally held raised by energization of the solenoid. The lower frame of the bracket 129 is provided with a separate anvil 139 which is positioned under the off center disc 135 and extends into slot 118$^b$ in table 118, see Figs. 1 and 34.

Mounted on each end of the base 112 are a pair of adjustable threaded screws 140 and 141 which are mounted for rotation in the standards 113 and 117 and threadedly engage a pair of blocks 143$^a$ and 142$^a$ which are slidable on the rod pairs 123 and 123$^a$, respectively. The blocks 143$^a$ and 142$^a$ are threadedly engaged by the screws 140 and 141 respectively. Mounted on the blocks 143$^a$ and 142$^a$ respectively, are a pair of dashpot assemblies 143 and 142. These assemblies are of simple construction, consisting of cylinders in which pistons are slidably mounted and urged in an outward direction by compressed air so that the projecting ends of their piston rods 143$^b$ and 142$^b$, see Fig. 34, are normally fully projected. The closed opposite ends of the cylinders have adjustable bleed ports to control the rate of escapement of air therefrom when the plungers are pushed inwardly. The plungers of these dashpot assemblies are arranged to engage the carriage end frames 124 and 129 respectively, as is clearly shown, for example, in Fig. 4. They function, as will be described later, to cushion the stopping of the tag strip feeding assembly so as to prevent it from rebounding as it is brought to a stop.

Secured on the base 112 is an air cylinder 144 which is mounted in a pair of brackets, as shown in Fig. 31. Its piston rod 145 is connected to the carriage comprising the end frames 124 and 129 and connecting rods 126.

The circuit assembly for the main elements of this combination is shown diagrammatically in Fig. 6, and detailed reference thereto at this point seems unnecessary since the various circuits will be traced out in detail hereinafter. It is noted, however, that the micro switches S$^1$, S$^2$, S$^3$ and S$^4$ are actuated by cams which are clearly shown in Fig. 1. These cams C$^1$, C$^2$, C$^3$ and C$^4$ are mounted on the end of the shaft 10 and operate the switches S$^1$, S$^2$, S$^3$ and S$^4$ in proper sequence and for the proper time periods by reason of the shapes of the cam faces thereof. The cam C$^1$ is shown in elevation in Fig. 3.

The operation of the machine will now be described in detail. It will be assumed, of course, that the main motor 3 is operating, causing all the parts connected thereto, as previously described, to be in operation. Assume the carriage of the feeding mechanism is at the extreme left, which places the centering and feeding pin 128 at the extreme lefthand end of the slot 118$^a$ in the table 118, see Figs. 30 and 33. At this time solenoid 126 is energized, so that the pin 128 is above the ticket strip T, compressing a spring which normally holds the pin in the position shown in Fig. 33. At the same time, of course, the gripping off-center wheel 135 is at its lefthand position and the solenoid 131 is energized holding it raised again on opposing spring. At this time the cam C$^3$ comes into a position to open the normally closed microswitch S$^3$. Current then ceases to flow in the circuit comprising supply wire 300, see Fig. 36, closed switch 302 (a double-pole single-throw switch), wire 303, wire 310 to one terminal of each of the solenoids 126 and 131. From these solenoids the circuit continues by wire 311, the panel board, microswitch S$^3$, and wire 312, the panel board, wire 309, closed switch 302 and supply wire 301.

The opening of microswitch S$^3$ de-energizes both of the solenoids 126 and 131. Thus at the proper instant the cam C$^3$ causes de-energization of the strip feeding solenoids 126 and 131, causing the plunger 128, see Fig. 33, to descend under spring pressure, and pass through the hole in the aligned tag of the tap strip T. At the same time the de-energization of solenoid 131 permits spring pressure to cause counterclockwise rotation of the eccentric cam disc 135, see Fig. 35, to cause it to move down and engage the tag strip T at a distance from the pin 128 equal to the spacing between the disc 135 and pin 128, which can be adjusted. As indicated in Fig. 34, the plane of the upper end of the anvil 139 lies in the plane of the top side of the table 118, as the upper end of the anvil 139 operates in a slot 118$^b$, see Fig. 1, in the table 118. Thus the tag strip T is pinched between the eccentric disc 135 and the end of the anvil 139.

Immediately upon attainment of this condition, air is supplied to the lefthand end of the cylinder 144, causing the carriage which carries the pin 128 and cam disc 135 to move to the right. This comes about by the fact that cam $C^2$ closes normally open microswitch $S^2$, completing a circuit as follows: Current flows through closed switch 302, wire 303 to wire 310, wire 316, the electromagnetic operator 320 for the air cylinder valve, wire 317, microswitch $S^2$ which is now closed, wire 318, wire 312, wire 309 and switch 302 to wire 301. The energization of the electro-magnetic operator 320 for the air supply valve (not shown) for the engine 144 causes that valve to connect the engine with the pressure fluid supply source (not shown) supplying air to the lefthand end of the engine, moving its piston to the righthand end, and moving the carriage 124—129—126 to the extreme righthand position shown in Fig. 32.

At this point it is noted that the pressure fluid supply source, the piping and the control valve for the engine 144 are not shown since such air circuits are extremely old and well known.

As the carriage reaches the end of its stroke to the right, it strikes the plunger $142^b$, see Figs. 34, of the dashpot 142, to bring the carriage to a cushioned stop. Dashpots of this type are likewise very well known in the art and are provided with an adjustable bleed port to adjust the rate of deceleration with which the carriage stops. The purpose of this arrangement is to bring the rapidly moving carriage to a stop without causing it to rebound. The movement of the carriage to the right causes the tag strip T to be fed to the right to present a series of unstringed tags to the stringing mechanism.

It will be assumed, of course, that the stringing assemblies have been set and adjusted so that with this feeding stroke of the tag strip the holes in the tags of the freshly presented group will be brought into alignment under the string needles $50^b$. After the needles have entered the holes in the tags, the cam $C^3$ will move to a position so that the microswitch $S^3$ closes with the result that the solenoids 126 and 131 are energized.

Thus the feeding mechanism acts as an indexing means holding the tag strip exactly positioned until the string needles have penetrated the perforations in the tags.

The energization of solenoid 126 permits the compression spring of this assembly to raise the centering and feeding pin 128 out of the hole of the associated tag. At the same time the de-energization of solenoid 131 permits the spring of this assembly to raise the plunger 132, removing the operation force from the eccentric cam disc 135. This releases its grip on the tag strip T, so that on the return stroke of the carriage it will be free to return to the lefthand position mentioned above. Immediately thereafter the cam $C^2$ moves to a position so that the microswitch $S^2$ will open, breaking the circuit to the operator 320 of the air valve so that the valve will return to normal position, opening the lefthand end of the cylinder 144 to exhaust and supplying air to the righthand end. The result is that the carriage and the feeding mechanism will immediately be returned to its lefthand position, and here again its stopping will be cushioned by the dashpot assembly 143.

At this point it will be well to note that the adjusting screws 140 and 141 are arranged to initially position the dashpot assemblies 143 and 142, so that they will be brought into action to stop the carriage for either direction of movement, at the precisely correct time. This comes about by the fact that the dashpot assemblies are mounted on the blocks $143^a$ and $142^a$, so that when the screws 140 and 141 are rotated the position of the dashpot assemblies can be adjusted longitudinally to the proper positions.

In the meantime the carriage 21, see Figs. 6 and 7, has been moving up to the tag feeding mechanism, so that by the time the tag strip has been moved to present a new set of tags to the mechanism, the string needle assemblies will be aligned with the vertical axes which include the centers of the holes in the tags. This is brought about, as will be apparent from the previous description, by the fact that the cam tracks in the cams 13 and 14 acting on the cam followers $22^a$ and $22^b$, see Fig. 6, will have moved the carriage 21 to this forward position through the agency of the links 122 and 123.

When the string needles have been positioned as described, the needle bar 26 therefor will begin to move down the rods 23 and 24 through the action of the inside cam tracks of the cams $18^a$ and $18^b$, see Fig. 27. These cam tracks, acting on the followers $44^a$ and $46^a$, respectively, will pull the links 44 and 46 downwardly, causing the bar to descend to a point where the string needles project through the holes in the tags, which is the position clearly shown in Fig. 9.

This movement of the carriage 21 positions the string needles over the tag holes while the cutting and gripping assemblies 65 are moved under the tag strip T to the position shown in Fig. 9. As a matter of fact, the support bar 26 for the string needles and the support bar 67 for the string gripping and cutting assemblies are fixedly mounted on the carriage so as to be vertically positioned one upon the other, see Fig. 8, and to move together with the carriage 21. As the string needles move down to the position shown in Fig. 9, string C projecting therebelow, as shown in that figure, moves down between the pivoted lower string clamping lever 85 and fixed anvil 91. When thus positioned the gripping lever 85 pivots inwardly to clamp the end of the string between it and the anvil 92, a position clearly shown in Fig. 10.

The gripping lever 85 is caused to move to this position in the following manner: Shaft 7 is revolving, which drives the splined shaft 74, see Fig. 7, through the gear train comprising the pinions 69 and 70, wormwheel 72, gear $73^a$, shaft 73, gears $73^b$, $73^c$ and $73^d$. The resulting rotation of the splined shaft 74, see Fig. 26, causes the worm 75 to revolve and in turn to revolve the wormwheel 76 and the shaft 77. In turn the cam 80 is rotated, which acting through the cam follower 88 on the gripping lever 85, causes it to move in a counter-clockwise direction, Fig. 16, pinching the projecting end of the string between it and the anvil 92. This gripping occurs against the resistance of tension spring 91, see Fig. 26.

As soon as this gripping action is completed, the needle assembly starts to rise through the fact that the supporting bar 26 is moved upwardly by the links 44 and 46 in an obvious manner in view of the foregoing description of their actuation by the cams $18^a$ and $18^b$, see Fig. 27. At the same instant the normally energized solenoid $50^i$, Fig. 8, is de-energized. This comes about by the fact that normally closed microswitch $S^4$ is at this time opened by the cam $C^4$. Circuit for the solenoid $50^i$ is completed as follows: From the supply wire 300, through switch 302, wire 303, wire 313, through the panel board to the solenoid $50^i$, and thence by wire 314 through the closed microswitch $S^4$, wire 315, through the panel board to wire 312 and from thence through wire 309 and switch 302 to the other side of the circuit by 301. De-energization of the solenoid $50^i$ permits spring $50^j$, Fig. 8A, to cause clockwise rotation of the shaft $50^e$, relieving the pressure of spring $50^f$ on the bell crank lever $50^d$. The end of this lever which projects through the slot in the tubular string needle $50^b$, removes its pressure on the string C, so that as the needle assemblies rise, see Fig. 10, the string C is free to be pulled through the needles from the supply spool. This is a rather important feature of the invention because in similar prior art devices the gripping pressure on the string has not been released during its feeding, with the result that it tends to twist because of its naturally helical twisted form, with the result that when the string is cut off, as will be explained later, the string tends to withdraw into the string needle, which, of course, renders that needle inoperative.

It is important, as shown in Fig. 9, for example, that the string of course projects below the lower open end of the needle 50$^b$, so that it can be engaged by the gripping devices to hold it while the string is being fed. In this machine the pressure of the finger 50$^d$ on the string C is taken off while the string is being fed, but is immediately put back on again at the end of the feeding operation to hold the string so that its end will continue to project below the needle. The cam C$^4$ which controls the solenoid 50$^1$ is so shaped that at the end of the string feeding operation the solenoid 50$^1$ is energized, see Fig. 8A, so that the solenoid will move the spring 50$b$ in a counterclockwise direction to cause the bell crank lever 50$^d$ to again grip the string C. Thus it will be seen that each string C is gripped in its tubular needle except when the string is being fed through the needle, at which time it is freed so that it will not develop a twist causing it to withdraw into the tube when it is cut.

After the string needles have risen high enough to clear the tags, the carriage 21 begins to move back and as the needle assemblies continue to rise, the carriage continues to move back drawing some string from the supply, as indicated in Fig. 10. By this time the arms 25$^c$ and 25$^d$ move down to bring the bar 25$^f$ into contact with the string. As 25$^f$ continues down it aids it, drawing more string through the needles 50$^b$ over the top edge of fixed bar 25$^h$. While this is happening the knotter bills rotate 90 degrees in a clockwise direction, see Figs. 17 and 18, so that when those bills descend, see Fig. 11, the strings will be under the bills.

At the completion of this operation a double loop of string has been pulled and the needles again descend to bring the end of the string in the needle back to a position where it can be gripped by the gripper lever 84, see Fig. 26, against anvil 92. When the needle tubes have descended to bring the string into this position the gripper lever 84 moves in to grip the string against the anvil 92, Fig. 11.

As is clear from Fig. 24 gripper arm 84 has a notch 84$^a$ in it so that it will not engage the needle tube. The needle assemblies begin to rise and shortly thereafter the cutter arm 83 swings in to cut the string off by cooperation with the cutting edge on the upper end of the anvil 92, see also Fig. 25. When the cutting occurs the end of the string will be projecting beyond the end of the needle tube the required distance. By this time the carriage 21 has moved back its full amount for this part of the operation and the double loop of string extends substantially horizontally from the tags to the gripping assemblies.

The movement of the carriage pulls about 2½ inches of string. Additional string is pulled by the bar 25$^f$ depending on its point of vertical attachment to the arms 25$^c$ and 25$^d$. The machine illustrated can pull from 3 to 7 inches of string or an additional amount of ½ to 4½ inches over that resulting from the carriage movement.

Figure 11:
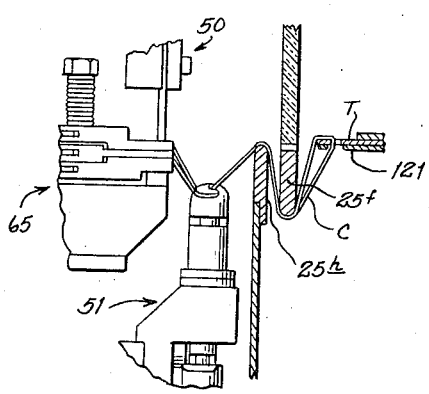

At this point it might be well to explain in connection, for example with Fig. 11, the purpose of the hooked end plates 121 forming part of the feeding and cutting mechanism. As is clear from Fig. 26, also, the plates 121 lie under the projecting ends of the tags T with the holes of the tags over the bights of the hooks. Thus the tags are supported when the needles come down to penetrate their apertures, so that if there is a slight misalignment the needle tubes will enter the holes in the tags without deflecting the tags. In addition, during the time when the carriage is moving backwardly to feed the string from the supply the hooks take the strain of feeding the string, thereby preventing breaking out the holes of the tags. This all can be visualized from Fig. 11.

The knotters, it will be recalled, are mounted on the vertically reciprocable bar 27 and are caused to rise through the vertical movement of the slides 34 and 35 on the rods 28 and 29. These slides are driven by the links 45 and 47 which have the cam followers 45$^a$ and 47$^a$ in grooves on the face cams 42 and 43, see Fig. 27. Thus, as the double loops of the strings are deflected by the abutment bars 25$^f$ and 25$^h$, the knotters rise and turn so that the string ends remain under the bills of the knotters. At this time, in a rotational sense, the knotters move from the position shown in Fig. 11 to the position shown in Fig. 12, i.e. in a counterclockwise direction, see also Fig. 19.

Figure 12:
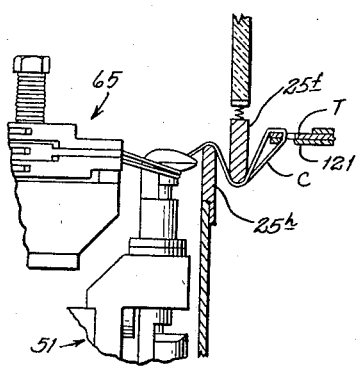
Figure 13:
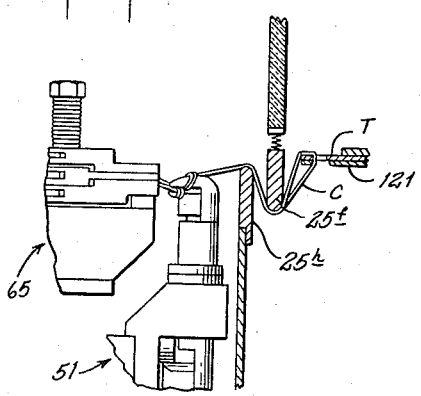
Figure 14:
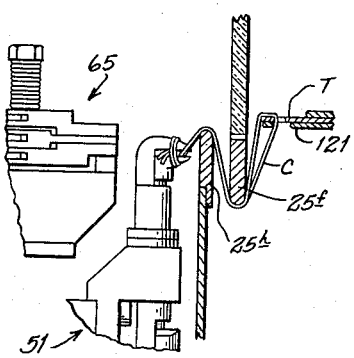
Figures 17, 18, 19, 20, 21:
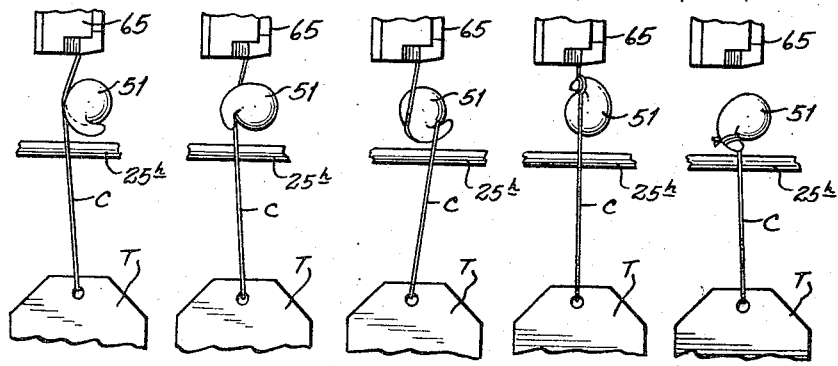

The bills are shaped so that as the knotter is rotated the string will be certain to pass around the bills, as indicated in Figs. 12 and 19, and as the bills continue to revolve a closed loop, i.e. a knot, will be formed in the string around the bills, see Figs. 13 and 20. As this is occurring the abutment bar 25$^f$ assembly moves upwardly to supply the extra length of string required as the loop is formed. This bar being spring loaded keeps at pressure on the strings. As the loop is completed, as indicated in Figs. 14 and 21, the bills open enough so that as they rotate further around, the two ends of the strings will pass between them. The resiliently supported abutment bar 25$^f$ can adjust its position and continue its pressure on the strings by reason of the spring pressure thereon.

At the right instant the two gripper fingers 85 and 84 open up, releasing the ends of the string therefrom, which is now held in the bills of the knotter assembly, also shown in Figs. 14 and 21. As the knotter assembly continues to revolve, the loop formed around the bills is pulled off the noses of the bills while the extreme ends of the strings are being held by them to form the knot. The spring loaded abutment bar 25$^f$ continues to keep the strings under tension to pull them off the bills and to cause the tightening of the knot. Finally, when the knot is tight the carriage 21 begins to move backwardly, moving the knotter bill assemblies to the left, still further tightening the string until the ends are pulled out from between the beaks, see Fig. 15.

The manner in which the knotter is rotated will now be described. Referring to Fig. 4, it will be recalled that the bar 93 carrying the rack 93$^a$ can be reciprocated in the direction of its length. This is produced, see Fig. 6, by oscillation of the bell crank lever 100 by the cam 17. Oscillation of the lever 100 causes reciprocation of the block 97, which acting through slotted arm 96 on the cam roller 95, causes the support 94 for the rack 93 to move back and forth in the direction of its length. This movement of the rack 93$^a$ drives the gears 53, which as previously described, causes the knotter bills to revolve. During their rotation the bills are caused to open to receive the loop ends by reason of the engagement at the proper time of the cam 62, which rotates therewith, with the fixed cam roller 63, as previously described. Of course, later the same cam releases the bill assembly, so that the spring 61 can close the bills.

When the knots have been tied in the strings for the set of tags being processed and the strings are free of the knotters, the operation begins over again with the feeding of the tag strip T to present a new set of tags for stringing. At this time an air blast is supplied from a nozzle (not shown) to blow the strings away from the mechanism of the machine, so that they will not become entangled therewith, and the air is supplied to the nozzle for this purpose in the following manner: At the right moment cam C' closes the switch S' completing a circuit from wire 303 through wire 304 to the electromagnetic operator 305 for the air supply valve for the nozzle. Current flows from operator 305 through wire 306 to the microswitch S' which is now closed, through it to wire 306, back to wire 309, switch 302 and current supply lead 308. The actuator 305 remains operated to keep the strings free of the mechanism until the completion of the next feeding step for the tag strip by which time cam C' permits microswitch S' to open, cutting off air supply to the nozzle.

In passing, it is noted that the curved ends 119 of the feeding assembly support the tag strip from the supply reel (not shown) at the lefthand end and to the take-up reel (not shown) at the righthand end, these reels being mounted below the table 118.

From the foregoing description it will be apparent that there is disclosed herein a machine which when adjusted and set in operation is completely automatic, stringing tags at a very high speed in groups of a predetermined number.

A very important feature of this invention is the provision of a mechanism which can be adjusted to provide tags with strings of predetermined lengths varying over a substantial but practical range.

Another very important advantage of this mechanism is the provision of a machine in which the string feeding and knotting devices are arranged in aligned groups, the center to center spacing of which can be infinitely varied within the range of the machine to adapt it to stringing tags of varying widths.

Many other additional advantages are inherent in this mechanism and those skilled in the art will readily appreciate that these advantages individually and in combination can be attained in machines which vary in details from that herein selected for the purpose of illustrating the novel subject matter of this invention. It is preferred, therefore, that the scope of the invention be determined by the appended claims rather than by the single example herein illustrated.

What is claimed is:

1. In a tag stringing machine the combination comprising a stationary tag strip supporting table, means for intermittently advancing a perforated tag strip along said table in the direction of its length to position successive lengths thereof at tag stringing stations, a carriage reciprocable at right angles to said table in a plane parallel thereto, needle and knotter assembly bars mounted on said carriage for reciprocation in paths at right angles to said table, a plurality of needle and knotter assemblies mounted on said respective bars, means for individually locking said assemblies on their respective bars at desired positions therealong in lateral alignment in pairs, a gripper support bar fixed on said carriage, a plurality of string gripping assemblies on said last bar, means for individually locking said gripping assemblies on said last bar in vertical alignment with said needle assemblies, and means for effecting timed actuation of said strip advancing means, carriage, needle, knotter and gripping bars and of said knotters and grippers to insert strings in the perforations of said strip and tie knots in their ends.

2. In the combination of claim 1, said tag strip advancing means including a reciprocable support having a feed pin and a clamp mounted thereon for engaging the strip during its advance.

3. In the combination of claim 1, said tag strip advancing means including a reciprocable support having a feed pin and a clamp mounted thereon, and means actuated by said actuating means in timed relation to project and withdraw said pin from the leading perforation of each successive length and for actuating said clamping means to grip the strip at the beginning of the feed and release it at the end.

4. In the combination of claim 1, said strip feeding means including an individually energized motor drive for effecting successive actuations in opposite directions.

5. In the combination of claim 1, said advancing means including a reciprocable carriage and means for cushioning the movement of the carriage at each end of its stroke to prevent rebounding.

6. In the combination of claim 1, said gripper assemblies including independently actuatable grippers for first gripping the feed end of the string and then gripping its terminal end.

7. In the combination of claim 1, said gripper assemblies including independently actuatable grippers for first gripping the feed end of the string and then gripping its terminal end, and string cutters forming part of said gripping assemblies for severing the string after both ends are gripped.

8. In the combination of claim 1, a spring loaded abutment bar operated by said actuating means for engaging the strings between the grippers and the tags to aid in the string feeding operation.

9. In the combination of claim 1, a spring loaded abutment bar operated by said actuating means for engaging the strings between the grippers and the tags to aid in the string feeding operation and subsequently to deflect the strings into operative relation with said knotters.

10. In the combination of claim 1, said knotters including string gripping beaks and means for guiding the ends of the strings into said beaks prior to the knotting operation.

11. In the combination of claim 1, said knotters including string gripping beaks, means for guiding the ends of the strings into said beaks prior to the knotting operation, and means for retracting the knotters during a knotting operation to tie knots in the strings and withdraw them from the beaks.

12. In the combination of claim 1, said needles comprising tubes through which the strings pass, individual string holders for each tube, and means for releasing said holders while the string is being pulled through the tubes.

13. In the combination of claim 1, said strip feeding advancing means including a feeding and indexing pin engageable with the perforations of said strip, and means for retracting the pin from said perforation after the needles have penetrated the strip perforations.

14. In the combination of claim 1, said strings being drawn the proper length by the retraction of said carriage with respect to said table, and reciprocable means mounted on said carriage for engaging the string during the feeding operation to aid feeding and to hold the string under yielding pressure.

15. In the combination of claim 1, said strings being drawn to a predetermined length by the retraction of said carriage from said table, and means for deflecting the drawn strings into engagement with said knotters.

References Cited in the file of this patent

UNITED STATES PATENTS 2,004,163     Graeber                June 11, 1935